United States Patent
Künz

(10) Patent No.: US 7,775,787 B2
(45) Date of Patent: Aug. 17, 2010

(54) BLOW-MOULD ARRANGEMENT COMPRISING EJECTORS, FOR AN EXTRUSION-BLOW MOULDER FOR PRODUCING PLASTIC CONTAINERS

(75) Inventor: Johann Künz, Hard (AT)

(73) Assignee: Alpla Werke Alwin Lehner GmbH & Co., KG., Hard (AT)

( * ) Notice: Subject to any disclaimer, the term of this patent is extended or adjusted under 35 U.S.C. 154(b) by 680 days.

(21) Appl. No.: 11/630,791

(22) PCT Filed: Jun. 15, 2005

(86) PCT No.: PCT/EP2005/006429

§ 371 (c)(1),
(2), (4) Date: Jul. 30, 2007

(87) PCT Pub. No.: WO2006/000328

PCT Pub. Date: Jan. 5, 2006

(65) Prior Publication Data

US 2008/0038399 A1  Feb. 14, 2008

(30) Foreign Application Priority Data

Jun. 28, 2004 (CH) .................................. 1085/04

(51) Int. Cl.
*B29C 49/58* (2006.01)
*B29C 49/70* (2006.01)

(52) U.S. Cl. ........................ 425/535; 425/536; 425/537; 425/538

(58) Field of Classification Search ................ 425/535, 425/536, 537, 538; 264/527
See application file for complete search history.

(56) References Cited

U.S. PATENT DOCUMENTS

| RE23,564 | E | * | 10/1952 | Hobson | 264/527 |
|---|---|---|---|---|---|
| 3,585,682 | A | * | 6/1971 | Martelli | 425/532 |
| 3,804,573 | A | * | 4/1974 | Del Piero | 425/537 |
| 3,807,928 | A | * | 4/1974 | Horberg et al. | 425/537 |
| 3,862,698 | A | * | 1/1975 | Hafele | 264/527 |
| 3,901,638 | A | * | 8/1975 | Yoshikawa et al. | 425/326.1 |
| 3,969,059 | A | * | 7/1976 | Michel | 425/539 |
| 5,372,495 | A | | 12/1994 | Ogura et al. | |
| 6,171,542 | B1 | | 1/2001 | Struble | |
| 7,037,101 | B2 | * | 5/2006 | Krohn et al. | 425/537 |
| 7,101,506 | B1 | * | 9/2006 | Taylor et al. | 425/537 |
| 2008/0128959 | A1 | * | 6/2008 | Kunz | 264/527 |

FOREIGN PATENT DOCUMENTS

| EP | 0 633 123 A | | 1/1995 |
| FR | 1556881 A | * | 12/1968 |
| JP | 09058645 A | | 3/1997 |

* cited by examiner

Primary Examiner—Robert B Davis
(74) Attorney, Agent, or Firm—Buchanan Ingersoll & Rooney PC

(57) ABSTRACT

Blow molding tool arrangement is disclosed for an extrusion blow molding machine for plastic containers, especially for plastic bottles, comprising two or more blow mold parts (1, 2) which can be moved from an open into a closed position and vice versa and in the closed state border a mold cavity (7) which has at least one access opening (22) for a blow mandrel (8), and with at least one laterally movable ejection device (10) for removing from the mold a plastic tube which has been inflated by overpressure according to the mold cavity (7). The ejection device (10) is arranged such that it can be extended laterally relative to the inside wall of the mold during ejection and touches the plastic tubing upon ejection in a lost section (74) which is detached after removal from the mold.

10 Claims, 1 Drawing Sheet

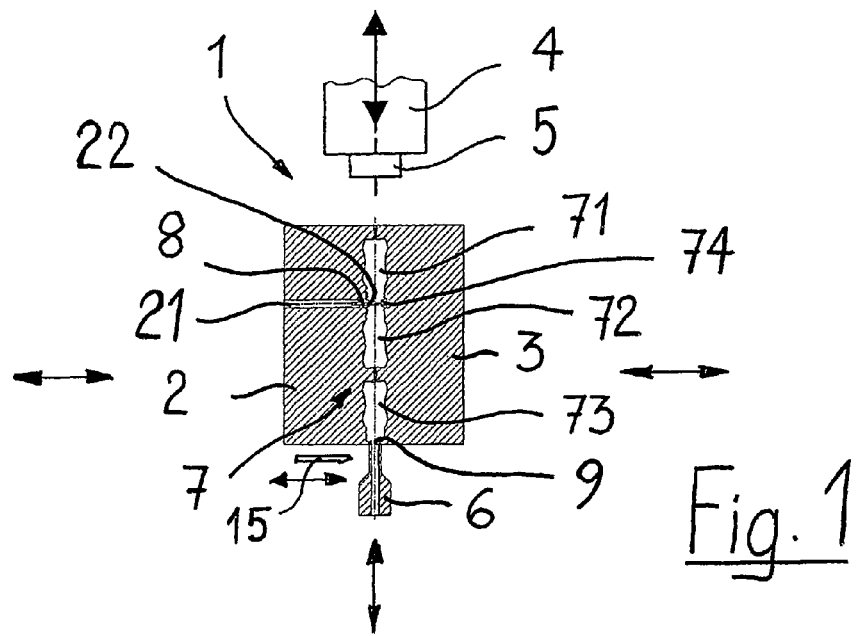
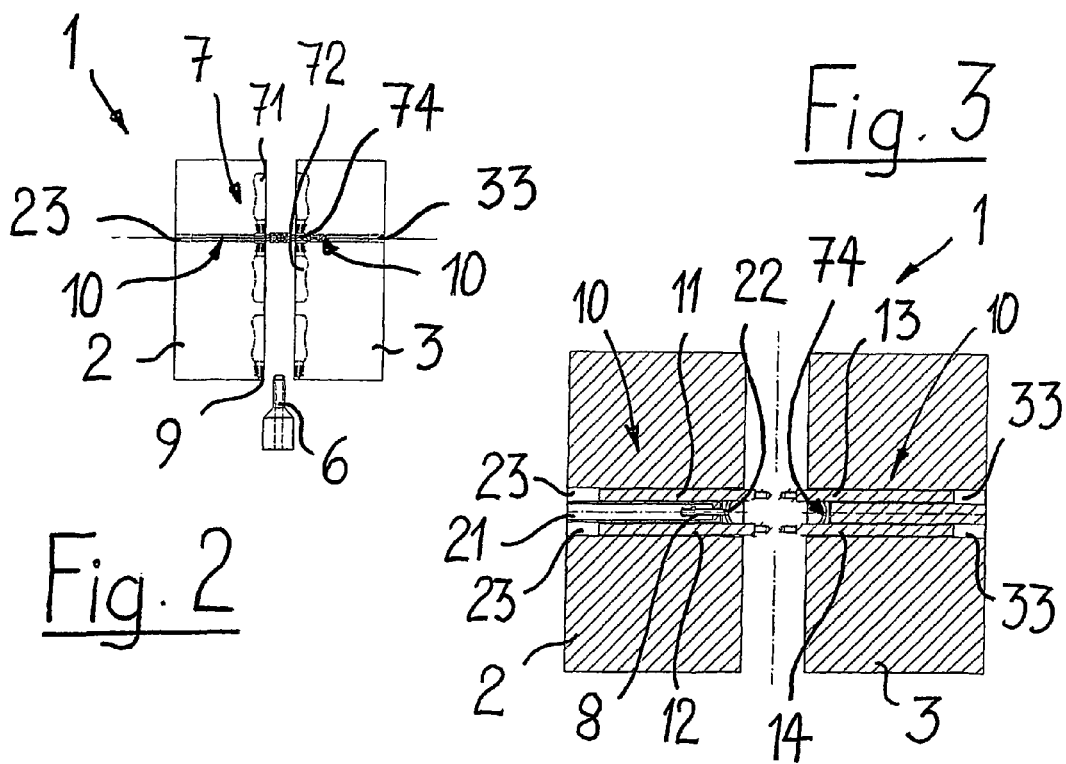

BLOW-MOULD ARRANGEMENT COMPRISING EJECTORS, FOR AN EXTRUSION-BLOW MOULDER FOR PRODUCING PLASTIC CONTAINERS

CROSS REFERENCE TO RELATED APPLICATIONS

This application claims priority under 35 U.S.C. §119 to Swiss Application 01085/04 filed in Switzerland on 28 Jun. 2004, and is a US national phase application of PCT/EP2005/006429 filed as an International Application on 15 Jun. 2005 designating the U.S., the entire contents of which are hereby incorporated by reference in their entireties.

FIELD

The invention relates to a blow molding tool arrangement for an extrusion blow molding machine for plastic containers, especially for plastic bottles.

BACKGROUND INFORMATION

Containers which were conventional in the past, of white or colored sheet metal, of glass or also ceramic are being increasingly replaced by plastic containers. Mainly plastic containers are used for packaging of fluid substances, for example beverages, oil, cleaning products, cosmetics, etc. The low weight and lower costs certainly play a not inconsiderable part in this substitution. The use of recyclable plastic materials and the altogether more favorable overall energy balance in their production also contribute to promoting the acceptance of plastic containers, especially plastic bottles, among consumers.

The production of plastic containers, especially plastic bottles, for example from polyethylene or polypropylene, takes place in an extrusion blow molding process, especially in an extruded tube blowing process. In this connection a plastic tube is extruded from an extruder head, placed in the blow molding tool arrangement, inflated by overpressure via a blow mandrel, and cured. The extrusion blow molding machines used for this purpose generally have at least one extruder for supplying the plastic material. The output of the extruder is connected to the extruder head, and a tube extruded in one or more layers emerges on its exit nozzle which can be adjusted preferably in opening width. The extruded plastic tubing can have one or more layers, and can be extruded as tubing with visible strips, decorative strips or relative to the periphery with several, preferably variously colored segments. The extruded tubing is transferred to the blow molding tool arrangement and inflated by overpressure using a blow mandrel which is inserted into the mold cavity. Afterwards the inflated plastic container is removed from the mold cavity.

The number of plastic containers which can be produced per unit of time and per cycle directly influences the economic efficiency of the production process, the manufacturing costs of the individual containers and thus the amortization of the blow molding tool and the production facility. The effect of the quantitative factor is greater, the smaller the plastic container to be produced. For this reason extrusion blow molding systems are known in which the blow molding tool arrangement has one double cavity per extrusion nozzle. The double cavity consists of two mold cavities which are arranged axially under one another and which are connected to one another at the mouths of the containers to be inflated. The blow mandrel which is guided in a hole of the blow molding tool can be laterally fed to the region of the mutually adjoining mouths of the blow mold cavities. The blow mandrel penetrates the wall of the plastic tubing in a middle region which connects the two mouths and inflates two containers in one cycle from the plastic tubing which has been inserted into the double cavity. The finished-inflated containers are then removed from the blow mold cavities.

To remove the finish-inflated plastic containers, especially plastic bottles, from the mold, there are ejectors in the blow molding tool arrangement. The ejectors are located in the peripheral regions of the blow molding tool arrangement and generally act in one section of the plastic container which borders its bottom region. In this connection it can happen that the ejectors leave impressions in the wall of the not yet completely cured plastic containers. These impressions are however undesirable on plastic containers. On the one hand they adversely influence the appearance of the plastic containers. On the other hand the impressions, depending on their depth and the wall thickness of the plastic containers, can constitute unwanted weakening regions.

SUMMARY

The object of this invention is therefore to improve a blow molding tool arrangement for an extrusion blow molding machine such that no impressions of ejectors and similar mold removal aids remain on the finish-blown plastic containers which have been removed from the molds.

This object is achieved in a blow molding tool arrangement for an extrusion blow molding machine for plastic containers, especially for plastic bottles, as specified in the following. In addition, preferred versions and/or developments of exemplary embodiments of the invention are described.

A blow molding tool arrangement for an extrusion blow molding machine for plastic containers, especially for plastic bottles, has two or more blow mold parts which can be moved from an open into a closed position and vice versa. The blow mold parts in the closed state border a mold cavity which has at least one access opening for a blow mandrel. The blow molding tool arrangement is equipped with at least one laterally movable ejection device for removing from the mold a plastic tube which has been inflated by overpressure according to the mold cavity. The ejection device is made such that it can be extended laterally relative to the inside wall of the mold during ejection and touches the plastic tubing upon ejection in a lost section which is detached after removal from the mold. In each blow mold part there are two ejection pistons which are guided in holes which run roughly at the same height of the blow mold part and essentially parallel to one another.

Impressions or pressure marks on the finish-blown containers are reliably avoided by the arrangement of the ejection device as claimed in the invention. During ejection the ejection device touches the plastic tubing only in one section which is detached after removal from the mold. This so-called lost section is inevitable in the production of plastic containers. By the lost section being chosen as the contact region for the ejection device the actual plastic container remains free of impressions, deformations or even damage.

The arrangement of the ejection device as claimed in the invention is especially advantageous in blow molding tool arrangements in which the blow mold parts encompass a mold cavity which is composed of several blow mold cavities. In this blow molding tool arrangement at least two of the blow mold cavities form a double cavity. The mouth regions of the individual cavities which comprise the double cavity pass into one another. The mouth regions of the individual cavities are interconnected here via a middle section. An access opening for the blow mandrel is located in the region of this middle section of the mouth regions of the double cavity. In this version of the blow molding tool arrangement the blow mandrel is arranged to be movably guided within a hole of one blow mold part. Blow molding tool arrangements with mold cavities composed of several blow mold cavities are used mainly for producing plastic containers, especially plastic bottles which have a smaller height. Since these smaller plastic bottles are produced on conventional extrusion blow molding machines, the conventional standard height of the blow molding tool arrangement is available. In order to use the entire height of the blow molding tool arrangement, two or even more blow mold cavities are arranged axially under one another. In the case of a mold cavity made of a connected double cavity, the blow mandrel guided within the blow molding tool arrangement can be fed to the mold cavity. If the mold cavity has still another double cavity, there can be another blow mandrel within another hole in the blow molding tool arrangement. If a single cavity axially follows the double cavity, it is aligned such that on the surface of the blow molding tool arrangement it has a mouth into which another free blow mandrel can be inserted. Blow molding tool arrangements with mold cavities which are composed of two or more blow mold cavities make it possible to blow twice, three times or an even larger number of containers at only relatively low added cost for the tool in one cycle.

In blow molding tool arrangements with a double cavity, the ejection device is advantageously arranged such that the plastic tubing is touched in the middle section between the mouth regions of the individual cavities as it is being ejected. The middle section thus forms the lost section which is detached from the plastic containers which have been removed from the mold. The middle section between the mouth regions of the finish-blown plastic containers which have been removed from the mold is detached from the containers anyway. Since the ejection device in the ejection process acts in the middle section, any impressions can only occur there. The plastic containers are free of any such impressions of the ejection device when the middle section is detached.

Due to the simpler structure and overall simpler movement sequences, the blow molding tool arrangement is advantageously built from only two blow mold halves. The ejection device then advantageously comprises at least two ejection pistons which are each guided in holes of the opposing blow mold halves. This arrangement has a comparatively simple construction. The movement sequences for opening and closing the blow mold halves and the actuation of the ejection pistons are simple and can be easily controlled. When the tool is opened the containers are left in the "middle position" aligned axially to the blow nozzle. This avoids damage to the containers and keeps the extruded tubing adjoining the upper bottle in a neutral position.

To ensure reliable and prompt removal of the inflated containers from the mold, in each blow mold half there are two ejection pistons. The ejection pistons are guided in holes in the respective blow mold half. They run roughly at the same height of the blow mold half and essentially parallel to one another. By providing several ejection pistons the force with which a single piston acts on the contact region with the inflated tubing can be reduced.

For reasons of construction and so that the middle section between the mouth regions of the blow mold cavities comprising the double cavity can be kept as short as possible, it is advantageous if the holes for the ejection piston or pistons run in one of the mold halves roughly at the same height and essentially parallel to the hole for the blow mandrel. The holes for the ejection piston or pistons in the opposing mold halves are likewise located at a comparable height of the mold half.

The ejection device can advantageously be pneumatically or hydraulically actuated. This allows a good controlling and metering capacity of the ejection pressure. Especially for multiple tools with a large number of mold cavities located next to one another with double cavities, thus the mechanical and control engineering cost is greatly reduced. Coupling of the control channels for hydraulic or pneumatic actuation of the ejection devices thus provides for equalization of production tolerances and mechanical play.

BRIEF DESCRIPTION OF THE DRAWINGS

Other advantages and feasible embodiments of the invention will become apparent from the following description with reference to the schematics which are not to scale.

FIG. 1 shows a diagram of a blow molding tool arrangement with the extruder head indicated and with an additional blow mandrel;

FIG. 2 shows a blow molding tool arrangement as shown in FIG. 1 with the ejectors indicated; and FIG. 3 shows a cross section of the blow molding tool arrangement.

DETAILED DESCRIPTION

FIG. 1 schematically shows the arrangement of the hardware components of an extrusion blow molding system which are important to the invention. This extrusion blow molding system is especially a novel, so-called linear extrusion blow molding system in which the extruded plastic tubing is guided during the entire blowing cycle. The exact function of this linear system is however not of further importance to the invention. See PCT application no. PCT/CH2004/00047 for details in this respect.

In the schematic in FIG. 1 reference number 4 labels the extruder head which has an extrusion nozzle 5. The softened plastic which is supplied via the extruder is extruded as a single-ply or multiple-ply tube by the extrusion nozzle 5 of the extruder head 4. Reference number 1 stands for the blow molding tool arrangement which accepts the extruded plastic tubing. According to this embodiment the blow molding tool means comprises two blow mold halves 2, 3 which border a mold cavity. 7. The mold cavity 7 is composed of several blow mold cavities 71, 72, 73 which are located under one another. Two of the total three blow mold cavities 71, 72 according to this embodiment are arranged to one another such that their mouth areas pass into one another. The mouth areas of the individual cavities 71, 72 are connected to one another by the middle section 74. A third, individual blow mold cavity 73 is separated by a land region from the bottom of the preceding blow mold cavity 72 and has a mouth 9 on the side of the blow molding tool arrangement 1 facing away from the extruder nozzle 5. Proceeding from the practical arrangement of the hardware components, the mouth 9 of the individual blow mold cavity 73 is located on the bottom of the blow molding tool arrangement 1. A so-called free blow mandrel labelled with reference number 6 can be inserted into the mouth 9 of the individual blow mold cavity 73. The blow molding tool arrangement 1 has a hole 21 which has an opening 22 in the region of the middle section 74. A blow mandrel 8 which can be moved laterally in the hole 21 can be fed to the double cavity 71, 72 through the opening 22 in the middle section 74.

The extruder head 4 and the blow molding tool arrangement 1 in the illustrated embodiment are arranged such that the axis of the blow mold cavity 7 and the output of the extrusion nozzle 5 on the extruder head 4 are axially flush with one another. In the illustrated embodiment the free blow mandrel 6 is arranged such that it is flush with the axis of the mold cavity 7 which is made for example in three parts. This is however not a critical requirement. It goes without saying that for an eccentrically arranged mouth of the individual blow mold cavity 73 the free blow mandrel 6 can also be laterally offset accordingly. Reference number 15 labels a blade which is used to cut the finish-blown hollow body arrangement off the extruded tubing.

The arrows shown in FIG. 2 indicate the adjustability of the individual hardware components. Thus the extruder head 4 can essentially only be adjusted with respect to its height in order to change the distance to the blow molding tool arrangement 1 during the extrusion and blowing process. For the required basic setting and fine adjustment however it has all degrees of freedom. The blow mold halves 2, 3 of the blow molding tool arrangement 1 can only be moved laterally from an open end position into a closed end position and vice versa. In one version of the extrusion blow molding system there can also be vertical adjustability for the blow molding tool arrangement 1. The blow mandrel 8 which is guided in the hole 21 is located at the height of the middle section of the blow mold cavity pair 71, 72. The free blow mandrel 6 is vertically adjustable in order to be able to be inserted into the mouth 9 of the individual blow mold cavity 73 and withdrawn again.

The illustrated blow molding tool arrangement with several, especially three blow mold cavities which are located axially under one another can for example also be a component of an extrusion blow molding device in which the blow molding tool arrangement can be moved away laterally after accepting the extruded tube and can be transported into a blowing station. In the case of these conventional extrusion blow molding systems the third, individual blow mold cavity can also have its mouth on the top of the blow molding tool arrangement. The free blow mandrel intended for the third blow mold cavity is then fed from overhead to the mouth of the third blow mold cavity. The guided blow mandrel which can be laterally fed within a hole of the blow molding tool arrangement at the height of the middle section of the paired blow mold cavities however also acts on the two blow mold cavities connected with their mouths.

FIGS. 2 and 3 show that the blow molding tool arrangement as claimed in the invention is equipped with ejectors 10 which when the mold halves 2,3 are opened can be extended relative to the inside wall of the mold and can facilitate removal of the finish-blown plastic containers, especially plastic bottles, from the mold. The ejectors 10 are guided in holes 23, 33 in the mold halves 2,3. The ejectors 10 are arranged such that they touch the finish-blown plastic container bottles only in the middle section 74, between the mouth regions of the connected blow mold cavities 71, 72. The middle section between the mouth areas is separated after removal from the mold. In this way no impressions at all from the ejectors 10 are visible on the finish-blown plastic containers.

One advantageous version of the invention calls for the ejectors 10 to be formed in the blow mold halves 2, 3 by ejection pistons 11, 12, and 13, 14 which are arranged to be laterally movable in pairs in essentially parallel running holes 23 and 33 of the respective blow mold halves 2,3. The holes 23, 33 in the blow mold halves 2,3 are located roughly at the same height of the blow mold halves 2, 3. As is apparent from FIG. 3, they run in the holes 23 in the blow mold half 2 to either side of the hole 21 for the blow mandrel 8 and roughly at the same height of the blow mold half 2. The ejection pistons 11-14 can preferably be hydraulically or pneumatically actuated. Here it is a good idea if the control channels for the hydraulic or pneumatic actuation of the ejection devices 10 are coupled among one another.

The invention was described in the schematics using the example of a blow molding tool arrangement with only one mold cavity. It goes without saying that the illustrated arrangement can also be used for multiple blow molding tools or arrangements of single and/or multiple blow molding tools. The number of blow mandrels is matched to the number of blow mold cavities. If several double cavities are located axially under one another, it can be advantageous to provide ejection devices for each double cavity, with contact points located in the middle section between the mouth areas of the connected blow mold cavities.

The invention claimed is:

1. Blow molding tool arrangement for an extrusion blow molding machine for plastic containers, especially for plastic bottles, comprising two or more blow mold parts which can be moved from an open position into a closed position and vice versa and in the closed state borders a mold cavity which has at least one access opening for a blow mandrel, and with at least one laterally movable ejection device for removing from the mold a plastic tube which has been inflated by overpressure according to the mold cavity, wherein the ejection device is arranged such that it can be extended laterally relative to the inside wall of the mold during ejection and touches the plastic tubing upon ejection in a lost section which is detached after removal from the mold, wherein the ejection device comprising each blow mold part includes two ejection pistons which are guided in holes which run roughly at the same height of the blow mold part and essentially parallel to one another.

2. Blow molding tool arrangement as claimed in claim 1, wherein the blow mold parts encompass the mold cavity which is composed of several blow mold cavities, at least two of the blow mold cavities forming a double cavity and having mouth regions which are connected to one another via a middle section, wherein an access opening for the blow mandrel is located in the middle section between the mouths of the double cavity, the blow mandrel being arranged to be movably guided within a hole of one of the blow mold parts.

3. Blow molding tool arrangement as claimed in claim 2, wherein the ejection device is arranged such that the plastic tubing is touched during ejection in the middle section which connects the mutually adjoining mouth regions of the double cavity.

4. Blow molding tool arrangement as claimed in claim 3, wherein the blow mold parts are blow mold halves and the two ejection pistons of each blow mold half are each guided in holes of the blow mold halves which are opposite one another.

5. Blow molding tool arrangement as claimed in claim 4, wherein the holes for the ejection piston run in one of the mold halves roughly at the same height and essentially parallel to the hole for the blow mandrel.

6. Blow molding tool arrangement as claimed in claim 5, wherein the ejection device can be actuated pneumatically or hydraulically.

7. Blow molding tool arrangement as claimed in claim 6, wherein it is a multiple tool with a number of mold cavities which are located next to one another, which each have at least one double cavity, and which are equipped with at least one ejection device for each mold cavity.

8. Blow molding tool arrangement as claimed in claim 7, wherein the control channels for hydraulic or pneumatic actuation of the ejection devices are coupled among one another.

9. Blow molding tool arrangement as claimed in claim 3, wherein the holes for the ejection pistons run in one of the mold halves parts roughly at the same height and essentially parallel to the hole for the blow mandrel.

10. Blow molding tool arrangement as claimed in claim 1, wherein the ejection device can be actuated pneumatically or hydraulically.

* * * * *